United States Patent
d'Entrecasteaux

(10) Patent No.: US 8,537,392 B2
(45) Date of Patent: Sep. 17, 2013

(54) FOLLOW-ME PRINTER DRIVER

(75) Inventor: Daryl d'Entrecasteaux, Cambourne (GB)

(73) Assignee: Xerox Corporation, Norwalk, CT (US)

( * ) Notice: Subject to any disclaimer, the term of this patent is extended or adjusted under 35 U.S.C. 154(b) by 639 days.

(21) Appl. No.: 12/760,819

(22) Filed: Apr. 15, 2010

(65) Prior Publication Data

US 2011/0255110 A1 Oct. 20, 2011

(51) Int. Cl.
*G06F 3/12* (2006.01)
*G06K 15/00* (2006.01)

(52) U.S. Cl.
USPC ......... 358/1.15; 358/1.1; 358/1.16; 358/1.13; 358/403; 358/1.14; 726/26; 726/27; 726/28

(58) Field of Classification Search
USPC ................ 358/1.11–1.18, 468, 434; 726/27; 713/167, 169, 193; 718/100; 709/217–219, 709/229; 715/738
See application file for complete search history.

(56) References Cited

U.S. PATENT DOCUMENTS

| | | | |
|---|---|---|---|
| 2006/0028677 A1* | 2/2006 | Isshiki et al. | 358/1.15 |
| 2006/0028678 A1* | 2/2006 | Negishi et al. | 358/1.15 |
| 2006/0048234 A1* | 3/2006 | Imaizumi et al. | 726/27 |
| 2006/0274355 A1* | 12/2006 | Ferlitsch et al. | 358/1.15 |
| 2008/0209419 A1 | 8/2008 | Maeda | |
| 2009/0100426 A1* | 4/2009 | Morales et al. | 718/100 |
| 2009/0310172 A1 | 12/2009 | Miyamoto | |
| 2010/0075291 A1* | 3/2010 | DeYoung et al. | 434/350 |
| 2010/0149572 A1* | 6/2010 | St. Jacques et al. | 358/1.13 |

\* cited by examiner

*Primary Examiner* — Chad Dickerson
(74) *Attorney, Agent, or Firm* — Kermit D. Lopez; Luis M. Ortiz; Tuesday A. Kaasch

(57) ABSTRACT

A method and system for follow-me printing, including a data-processing apparatus and rendering device in communication with a network. A user can elect a print request to be rendered at any one of the rendering devices, upon user authentication. A Follow-Me Printer Driver can be installed on a data-processing device in order to create a job ticket upon initiation of a print request. The job ticket can be sent to a designated rendering device and shared with all of the rendering devices connected to the network. The job ticket can then be retrieved at a destination rendering device upon a user authentication and a user selection of the print request. The job ticket can then be released for rendering at the destination rendering device.

17 Claims, 2 Drawing Sheets

FOLLOW-ME PRINTER DRIVER

TECHNICAL FIELD

Embodiments are generally related to networked printing environments. Embodiments are further related to improved follow-me printing systems and methods. Embodiments are additionally related to follow-me printer drivers and computer networks.

BACKGROUND OF THE INVENTION

A common mode of printing in a networked environment requires a user to select a preferred network printer to which a print request will be sent, often without knowledge of how many requests or pages may be positioned in a queue ahead of their request or whether resources may be needed at that particular printer. Such a situation can cause unnecessary delays and multiple requests for the same document, resulting in wasted resources, especially in networked environments where printers are located in another room or even on another floor from where the user is located.

A solution to this problem involves the implementation of a system in which a user can walk to any printer in the network pool and request that his or her job is released and printed at that particular printer. This 'walk and request' mode of printing is the basis of "Follow-Me Printing", sometimes referred to as "Pull Printing". Current technology enabling follow-me printing requires a customer to install additional applications and servers to track print jobs. Many users, however, are inconvenienced by having to provide additional hardware or pay maintenance costs for these solutions.

In addition, if a mixed fleet of printers is utilized, the follow-me print jobs may not print correctly if an incompatible printer driver was used to submit that print job to the pool (i.e., since printer drivers and printers are usually matched). This forces the user to select the correct driver when printing, but because the user may not know from which printer the job will be actually printed, the user will not have a way of knowing ahead of time which printer driver to select.

Based on the aforementioned limitations of the currently available follow-me printing technology, the inventor believes a need exists for an alternative, simpler, and inexpensive method and system that offer an improvement over currently available techniques and systems.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is one aspect of the disclosed embodiments to provide for an improved method and system of follow-me printing.

It is another aspect of the disclosed embodiments to provide for a method and system for follow-me printing that includes the use of a data-processing apparatus connected to a network and a plurality of rendering devices connected to the network.

It is yet another aspect of the disclosed embodiments to provide for a printer driver that can be installed on a data-processing device or a memory associated with such a data-processing device or service, in order to allow for follow-me printing.

The aforementioned aspects and other objectives and advantages can now be achieved as described herein. A method and system for follow-me printing includes a data-processing apparatus and rendering device in communication with a network. A user can elect a print request to be rendered at any one of the rendering devices, upon user authentication. A Follow-Me Printer Driver can be installed on a data-processing device in order to create a job ticket upon initiation of a print request. The job ticket can be sent to a designated rendering device and shared with all of a plurality of rendering devices connected to the network. The job ticket can then be retrieved at a destination rendering device upon a user authentication and a user selection of the print request. The job ticket can then be released for rendering at the destination rendering device.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

It is to be understood by persons of ordinary skill in the art that the following descriptions are provided for purposes of illustration and not for limitation. An artisan understands there are many variations that lie within the spirit of the invention and the scope of the appended claims. Unnecessary detail of known functions and operations may be omitted from the current description so as not to obscure the present invention.

Figure 1:
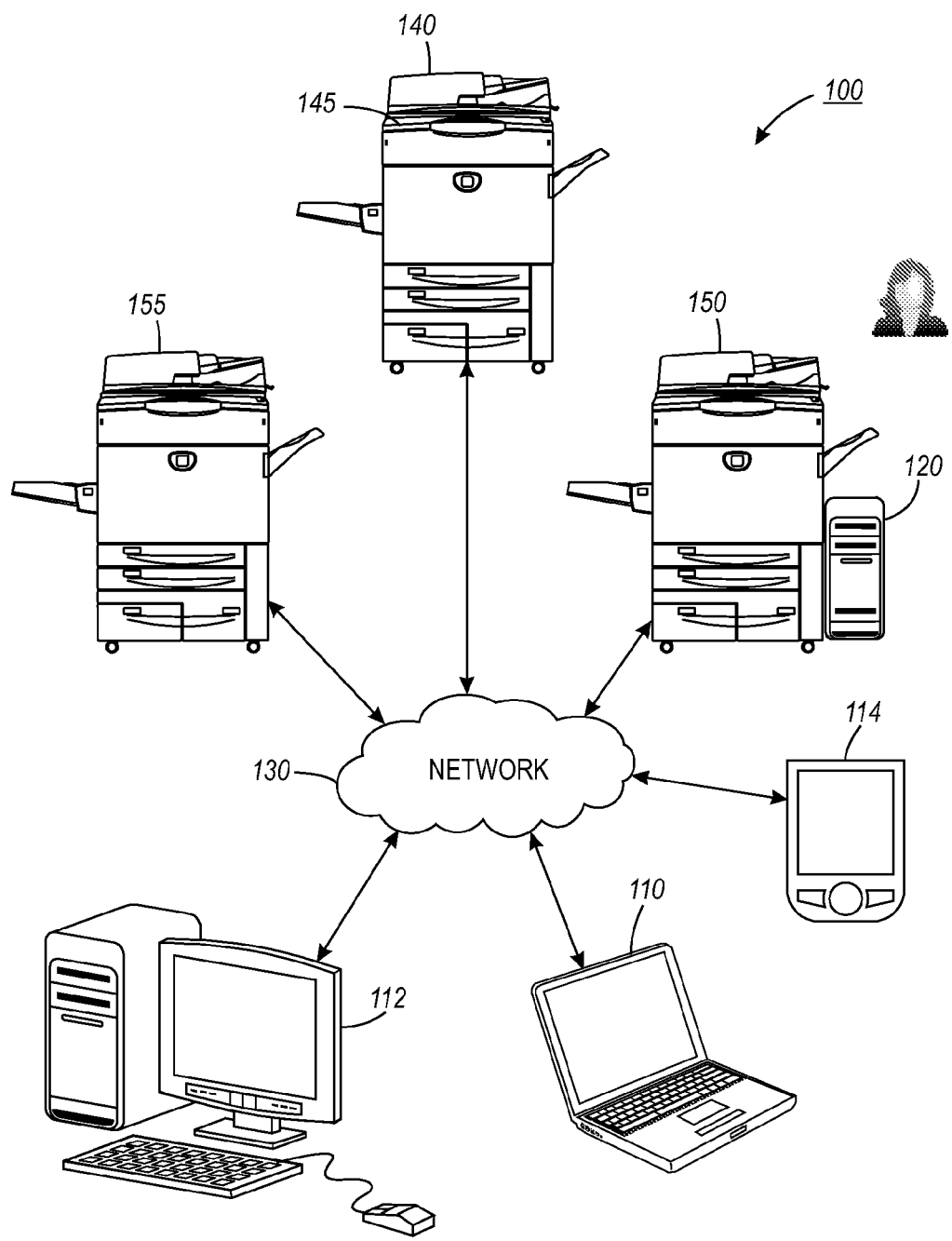
FIG. 1 illustrates an exemplary diagram of a data-processing environment, which can be implemented in accordance with the disclosed embodiments.

FIG. 1 illustrates an exemplary diagram of data processing environments in which embodiments of the present invention can be implemented. It should be appreciated that FIG. 1 is only exemplary and is not intended to assert or imply any limitation with regard to the environments in which aspects or embodiments can be implemented. Many modifications to the depicted environments can be made without departing from the spirit and scope of the disclosed embodiments.

Referring to FIG. 1, a system 100 includes one or more rendering devices 140, 150, 155 that can communicate electronically with one or more data-processing devices, such as devices 110, 112 and/or 114, through a network 130. The rendering devices 140, 150, 155 may be, for example, printers, MFDs, and so forth. The network 130 may employ any network topology, transmission medium, or network protocol. The network 130 may include connections such as wire, wireless communication links, or fiber optic cables. The data-processing device 110 can be, for example, a personal computer or other computing device. The network 130 may be, for example, a client/server network, the Internet, an internal organizational network, and so forth. In the scenario depicted in FIG. 1, the data-processing apparatus device 110 can be, for example, a laptop computer that communicates with the network 130. The data-processing apparatus 114 can be, for example, a so-called "Smartphone" or other similar wireless communications device, and data-processing apparatus 112 can be, for example, a personal computer, a desktop computer, a server, etc.

Note that as utilized herein, the term "rendering device" can refer to an apparatus or system such as a printer, scanner, fax machine, copy machine, etc., and/or a combination thereof. A MFD, for example, is an example of such a rendering device and is capable of multiple rendering functions such as printing, copying, scanning, faxing, etc. In some embodiments, rendering devices 140, 150, and/or 155 can be implemented with a single rendering function such as printing. In other embodiments, the rendering devices 140, 150, and/or 155 can be configured to provide multiple rendering functions such as scanning, faxing, printing and copying. Each of the rendering devices 140, 150, and/or 155 can include a user interface such as, for example, user interface 145, which can be configured as a panel menu. Such a panel menu can be employed to select features and enter other data to, for example, the rendering device 140. Such a user interface or panel menu may include, for example, a touch screen having touch activated keys for navigating through an option menu or the like. In other embodiments, the rendering devices 140, 150, and/or 155 can include means for user authentication. The rendering device 150, for example, can be connected to an external user authentication system, such as a smart card reader 120, or the various rendering device 140, 150, and/or 155 can be, for example, configured to include internal user identification.

A driver program, such as a printer driver, can be installed on the data-processing apparatus 110 and can reside on a hard drive or other appropriate memory location of a host device (e.g., apparatus 110). The driver program can be activated through an application interface so that a user may generate a print job with the printer driver for processing by the rendering device 140. The data-processing apparatus 110 can be, for example, any computing device capable of being integrated within a network such as a PDA, personal computer, cellular telephone, point-of-sale terminal, server, etc.

Figure 2:
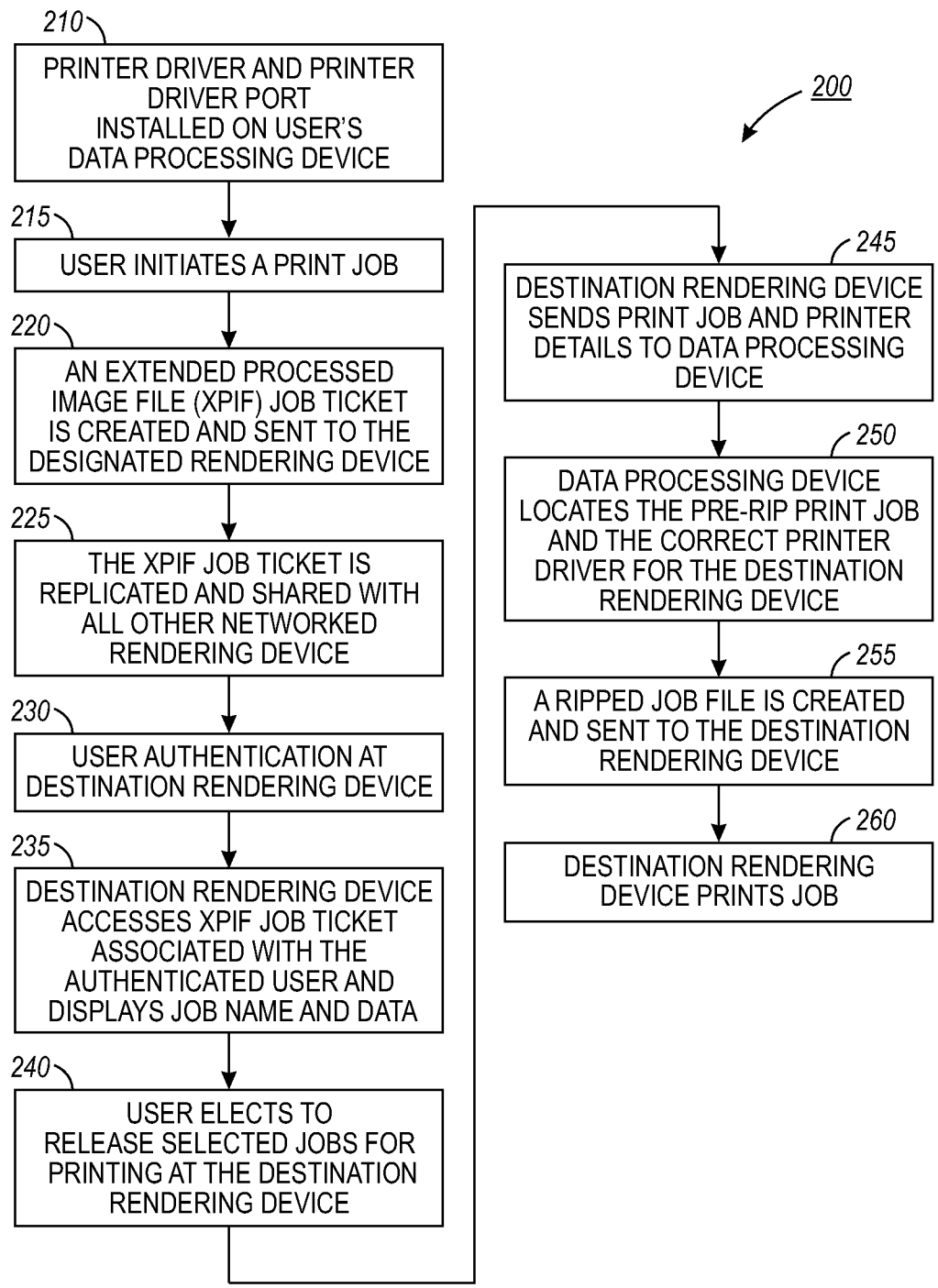
FIG. 2 illustrates a high-level flow chart indicating logical operational steps of method by which a follow-me printer driver can function to render a document at a destination rendering device, in accordance with the disclosed embodiments.

FIG. 2 illustrates a high-level flow chart of logical operations of a method 200 by which printer functions within the system 100 can render a document at a destination rendering device, in accordance with the disclosed embodiments. As indicated at block 210, a printer driver can be initially installed on a user's data processing device (e.g., device 110 of FIG. 1) by the user or a system administrator along with a printer driver port. A print job can then be initiated by a user, as shown at block 215, and the print job held in a pre-rip state at a the data processing device such as, for example, device 110 of FIG. 1. When the print job is initiated, an Extended Processed Image File (XPIF) job ticket can be created and transmitted to a designated rendering device (e.g., device 150) through a network (e.g., network 130), as depicted at block 220. It should be noted that the pre-rip print job is not forwarded at this time. The XPIF job ticket is then replicated and shared with all other networked rendering devices (e.g., rending devices 140, 155) as shown in block 225.

Next, as depicted at block 230, the user can identify themselves through authentication at any of the networked rendering devices 140, 150 and/or 155 using a smart card reader 120 or other means of authentication. Note with respect to the configuration depicted in FIG. 1, the rendering device at which the user is authenticated can be the destination rendering device 150. In such a scenario, the destination rendering device 150 can then access the XPIF job ticket associated with the authenticated user and display the job name and job data on, for example, the user interface 145, as depicted at block 235. If the destination rendering device 150 is equipped with an Extensible Interface Platform (EIP), a user can then mark the job ticket that he or she wishes to print from a list where the user has initiated multiple print jobs. Otherwise, the user is presented with an option to print all print jobs associated with that user.

As illustrated next at block 240, the user makes a selection to release the selected jobs for printing at the destination rendering device 150. The destination rendering device 150 can then contact, for example, the user's data processing device 110 via the network 130, either using, for example, Simple Network Management Protocol (SNMP) or a web service, and communicates the details of the selected print job(s) (i.e., the XPIF job ticket(s)) and details of the destination rendering device 150, as described at block 245.

Upon receipt of the XPIF job ticket(s) and information associated with destination rendering device 150, the user's data processing device 110, for example, can be instructed to locate the pre-rip print job(s) associated with the XPIF job ticket(s) and the correct printer driver or universal driver for the destination rendering device 150, as indicated at block 250. A ripped job file can then be created for each XPIF job ticket at, for example, the user's data processing device 110, and transmitted to the destination rendering device 150, as illustrated at block 255. The ripped job file can be rendered by the data processing device 110, for example, utilizing the correct driver/formatting for the destination rendering device 150. Upon receipt of the ripped job file, the destination rendering device 150 renders (e.g., prints) the document, as shown at block 260. The system 100 can optionally be configured to delete the XPIF job ticket, printer information, pre-rip job, and ripped job files from the data processing device 110 once printing is complete.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for follow-me printing, said method comprising:
    initiating a print job;
    a data-processing device connected to a network connected to a plurality of rendering devices;
    holding said print job in a pre-rip state on said data-processing device;
    creating an XPIF job ticket for said print job;
    distributing said XPIF job ticket to said plurality of rendering devices connected to said network;
    retrieving and accessing said XPIF job ticket at a destination rendering device among said plurality of rendering devices, upon an authentication of a user and selection of said print request performed at a destination rendering device;
    releasing said job-ticket for rendering via said destination rendering device through the selection of said print request at the destination rendering device;
    transmitting the XPIF job ticket and information associated with the destination rendering device to the data-processing device;
    locating said pre-rip print job associated with the XPIF job ticket and a driver for said destination rendering device on said data-processing device after said data-processing device receives the XPIF job ticket and information associated with the destination rendering device; and ripping the pre-rip print job associated with the XPIF job ticket by utilizing the located driver for said destination rendering device to create a ripped job file;

transmitting the ripped job file to the destination rendering device for rendering;

deleting the XPIF job ticket, information associated with the destination rendering device, pre-rip job and ripped pre-rip print job from the data-processing device once rendering is complete.

2. The method of claim 1 wherein at least one rendering device among said plurality of rendering devices comprises a printer.

3. The method of claim 1 wherein at least one rendering device among said plurality of rendering devices comprises a MFD.

4. The method of claim 1, wherein said plurality of rendering devices further comprises an Extensible Interface Platform (EIP).

5. The method of claim 1 wherein said plurality of rendering devices further comprises an external user authentication system.

6. The method of claim 1 further comprising configuring said plurality of rendering devices with an internal user authentication.

7. A computer-usable medium for follow-me printing, said computer-usable medium embodying computer program code, said computer program code comprising computer executable instructions configured for:

initiating a print job via a data processing device connected to a network connected to a plurality of rendering devices;

holding said print job in a pre-rip state on said data-processing device;

creating an XPIF job ticket for said print job;

distributing said XPIF job ticket to said plurality of rendering devices connected to said network;

retrieving and accessing said XPIF job ticket at a destination rendering device among said plurality of rendering devices, upon an authentication of a user and selection of said print request performed at a destination rendering device;

releasing said XPIF job ticket for rendering via said destination rendering device through the selection of said print request at the destination rendering device;

transmitting the XPIF job ticket and information associated with the destination rendering device to the data-processing device;

locating said pre-rip print job associated with the XPIF job ticket and a driver for said destination rendering device on said data-processing device after said data-processing device receives the XPIF job ticket and information associated with the destination rendering device; and ripping the pre-rip print job associated with the XPIF job ticket by utilizing the located driver for said destination rendering device to create a ripped job file;

transmitting the ripped job file to the destination rendering device for rendering;

deleting the XPIF job ticket, information associated with the destination rendering device, pre-rip job and ripped pre-rip print job from the data-processing device once rendering is complete.

8. The computer-usable medium of claim 7 wherein at least one rendering device among said plurality of rendering devices comprises a printer.

9. The computer-usable medium of claim 7 wherein at least one rendering device among said plurality of rendering devices comprises a MFD.

10. The computer-usable medium of claim 7 wherein said plurality of rendering devices further comprises an Extensible Interface Platform (EIP).

11. The computer-usable medium of claim 7 wherein said plurality of rendering devices further comprises an external user authentication system.

12. The computer-usable medium of claim 7 further comprising configuring said plurality of rendering devices with an internal user authentication.

13. A system for follow-me printing comprising:

a data-processing device operatively connected to a network;

a plurality of rendering devices comprising a follow-me printer driver operatively connected to said network, wherein one of said plurality of rendering devices is a designated rendering device and one of said rendering devices is a destination rendering device;

said follow-me printer driver being configured to:

initiate a print job via said data-processing device;

hold said print job in a pre-rip state on said data-processing device;

create an XPIF job ticket for said print job;

send said XPIF job ticket to said designated rendering device via said network;

distribute said XPIF job ticket to all of said plurality of rendering devices connected to said network;

retrieve and access said XPIF job ticket at said destination rendering device, upon authentication of a user and selection of said print request performed at a destination rendering device;

release said XPIF job ticket for rendering via said destination rendering device through the selection of said print request at the destination rendering device;

transmit the XPIF job ticket and information associated with the destination rendering device to the data-processing device;

locate said pre-rip print job associated with the XPIF job ticket and a driver for said destination rendering device on said data-processing device after said data-processing device receives the XPIF job ticket and information associated with the destination rendering device; and rips the pre-rip print job associated with the XPIF job ticket by utilizing the located driver for said destination rendering device to create a ripped job file;

transmits the ripped job file to the destination rendering device for rendering;

deletes the XPIF job ticket, information associated with the destination rendering device, pre-rip job and ripped pre-rip print job from the data-processing device once rendering is complete.

14. The system of claim 13 wherein said data processing device is installed with a follow-me printer driver port.

15. The system of claim 13 wherein said plurality of rendering devices further comprises an Extensible Interface Platform (EIP).

16. The system of claim 13 wherein said plurality of rendering devices further comprises an external user authentication system.

17. The system of claim 13 wherein said plurality of rendering devices are configured with an internal user authentication.

* * * * *

UNITED STATES PATENT AND TRADEMARK OFFICE
CERTIFICATE OF CORRECTION

| | | |
|---|---|---|
| PATENT NO. | : 8,537,392 B2 | Page 1 of 1 |
| APPLICATION NO. | : 12/760819 | |
| DATED | : September 17, 2013 | |
| INVENTOR(S) | : Daryl d'Entrecasteaux | |

It is certified that error appears in the above-identified patent and that said Letters Patent is hereby corrected as shown below:

In the Claims

Column 5, Claim 7, line 27, please insert -- non-transitory -- between "A" and "computer-usable";

Column 5, Claim 8, line 64, please insert -- non-transitory -- between "The" and "computer-usable";

Column 6, Claim 9, line 1, please insert -- non-transitory -- between "The" and "computer-usable";

Column 6, Claim 10, line 4, please insert -- non-transitory -- between "The" and "computer-usable";

Column 6, Claim 11, line 7, please insert -- non-transitory -- between "The" and "computer-usable";

Column 6, Claim 12, line 10, please insert -- non-transitory -- between "The" and "computer-usable".

Signed and Sealed this
Twenty-first Day of October, 2014

Michelle K. Lee
*Deputy Director of the United States Patent and Trademark Office*